(12) United States Patent
Robertson et al.

(10) Patent No.: US 9,135,157 B2
(45) Date of Patent: Sep. 15, 2015

(54) INTEGRATED CIRCUIT DEVICE, SIGNAL PROCESSING SYSTEM AND METHOD FOR PREFETCHING LINES OF DATA THEREFOR

(75) Inventors: Alistair Robertson, Glasgow (GB); Mark Maiolani, East Kilbride (GB)

(73) Assignee: Freescale Semiconductor, Inc., Austin, TX (US)

( * ) Notice: Subject to any disclaimer, the term of this patent is extended or adjusted under 35 U.S.C. 154(b) by 178 days.

(21) Appl. No.: 13/988,366

(22) PCT Filed: Nov. 22, 2010

(86) PCT No.: PCT/IB2010/055334
§ 371 (c)(1),
(2), (4) Date: May 20, 2013

(87) PCT Pub. No.: WO2012/069874
PCT Pub. Date: May 31, 2012

(65) Prior Publication Data
US 2013/0246695 A1    Sep. 19, 2013

(51) Int. Cl.
*G06F 12/00* (2006.01)
*G06F 12/02* (2006.01)
*G06F 12/08* (2006.01)
*G06F 9/38* (2006.01)

(52) U.S. Cl.
CPC .......... *G06F 12/0215* (2013.01); *G06F 9/3802* (2013.01); *G06F 9/3816* (2013.01); *G06F 12/0246* (2013.01); *G06F 12/0862* (2013.01); *G06F 2212/17* (2013.01); *G06F 2212/2022* (2013.01); *G06F 2212/6022* (2013.01)

(58) Field of Classification Search
CPC ............ G06F 12/0215; G06F 12/0246; G06F 12/0862; G06F 9/3802
USPC .......................................................... 711/137
See application file for complete search history.

(56) References Cited

U.S. PATENT DOCUMENTS

| | | | |
|---|---|---|---|
| 6,594,731 B1 * | 7/2003 | Hertwig et al. | 711/137 |
| 6,976,147 B1 | 12/2005 | Isaac et al. | |
| 7,124,262 B2 * | 10/2006 | Kadi | 711/156 |
| 7,487,297 B2 | 2/2009 | El-Essawy et al. | |
| 7,500,063 B2 * | 3/2009 | Zohar et al. | 711/137 |
| 7,506,106 B2 | 3/2009 | Diefendorff | |
| 7,509,459 B2 | 3/2009 | Diefendorff | |
| 7,610,351 B1 | 10/2009 | Gollapudi et al. | |
| 7,617,181 B2 | 11/2009 | Arnold et al. | |
| 2004/0123044 A1 | 6/2004 | Franaszek | |
| 2007/0186050 A1 | 8/2007 | Luick | |
| 2007/0283101 A1 | 12/2007 | El-Essawy et al. | |

FOREIGN PATENT DOCUMENTS

KR   10-2003-0002235 A   1/2003

OTHER PUBLICATIONS

International Search Report and Written Opinion correlating to PCT/IB2010/055334 dated Aug. 1, 2011.

* cited by examiner

*Primary Examiner* — Aracelis Ruiz

(57) ABSTRACT

An integrated circuit device comprising at least one prefetching module for prefetching lines of data from at least one memory element. The prefetching module is configured to determine a position of a requested block of data within a respective line of data of the at least one memory element, determine a number of subsequent lines of data to prefetch, based at least partly on the determined position of the requested block of data within the respective line of data of the at least one memory element, and cause the prefetching of n successive lines of data from the at least one memory element.

17 Claims, 3 Drawing Sheets

INTEGRATED CIRCUIT DEVICE, SIGNAL PROCESSING SYSTEM AND METHOD FOR PREFETCHING LINES OF DATA THEREFOR

FIELD OF THE INVENTION

The field of this invention relates to an integrated circuit device, a signal processing system and a method for prefetching lines of data therefor.

BACKGROUND OF THE INVENTION

Modern signal processing systems often use non-volatile memory to store data; such data comprising data to be processed, as well as instruction code and the like. One such non-volatile computer storage technology is Flash memory, which is a specific type of EEPROM (electrically erasable programmable read-only memory), that is capable of being erased and programmed in large blocks. Flash memory advantageously costs far less than byte-programmable EPROM (erasable programmable read-only memory), and as such has become a dominant technology wherever a significant amount of non-volatile, solid state storage is required.

However, Flash memory has a relatively slow access time compared with the speed of, say, a processing core or other communication bus master device accessing the memory. For example, for a processing core comprising an operating frequency of, say, 200 MHz, it would take approximately eight cycles of the processing core for a read access to be made directly from Flash memory with a read-access time of approximately 40 nsec. Such a delay in a processing core being able to access data can have a serious impact on overall system performance.

In order to improve the overall data throughput from Flash memory and the like, it is known to use prefetch mechanisms that make speculative data fetches from the Flash memory, and store the prefetched data in a small, relatively fast memory array buffer. In this manner, the prefetched data is ready to be accessed before the processing core, or other bus master device, has requested the data. Such speculative prefetching of data works well for linear code (e.g. code that executes from sequential addresses with no change of flow), since future read access requests are highly predictable. However, for code that has frequent changes of flow, such speculative prefetching can have a detrimental effect on system performance when unnecessary speculative prefetches occur. For example, data fetching from Flash memory is typically non-abortable due to typical architectures used for Flash memory. As a result, if, during a speculative prefetch, a data access is received from, say, a processing core for data not already prefetched (e.g. due to a flow change), an access of the Flash memory to retrieve the requested data must wait until the pending speculative prefetch access has completed. As such, an already slow access from the Flash memory is delayed even further.

A further problem with the use of prefetching mechanisms is that speculative prefetches of data that is not immediately required consume valuable buffer space, and unnecessarily remove previously fetched data from the buffer. As a result, the likelihood of a further access being necessary to retrieve the removed data is increased, thereby potentially delaying access to such data.

As signal processing systems are increasingly moving towards multiple-core architectures, where multiple bus-master devices require access to the same Flash arrays, the demands on prefetch mechanisms (and the associated buffer space) are increasing, and, thus, the instances of bus contentions are likely to increase. In such instances, it is especially important to avoid unnecessary speculative prefetches of data.

Furthermore, with current advances to higher operating frequencies, and with a current move towards relatively longer latency (lower cost) Flash memory modules, the efficiency of caches and prefetching mechanisms is becoming an increasingly significant factor in signal processing systems.

SUMMARY OF THE INVENTION

The present invention provides an integrated circuit device, a signal processing system and a method for prefetching lines of data from at least one memory element as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Examples of the present invention will now be described with reference to the drawings. In particular, examples of the present invention will be described with reference to a prefetching module or component or processor for prefetching lines of data from a Flash memory element. However, the present invention is not limited to use with only Flash memory elements, and in other examples may be applied to the prefetching of data from any type of memory element. Furthermore, examples of the present invention will be described with reference to a signal processing system comprising a plurality of system bus master devices, for example signal processing cores or the like. However, in some examples, the present invention is not limited to use within any specific signal processing architecture, and in particular may be implemented within a system comprising any number of system bus master devices.

Figure 1:
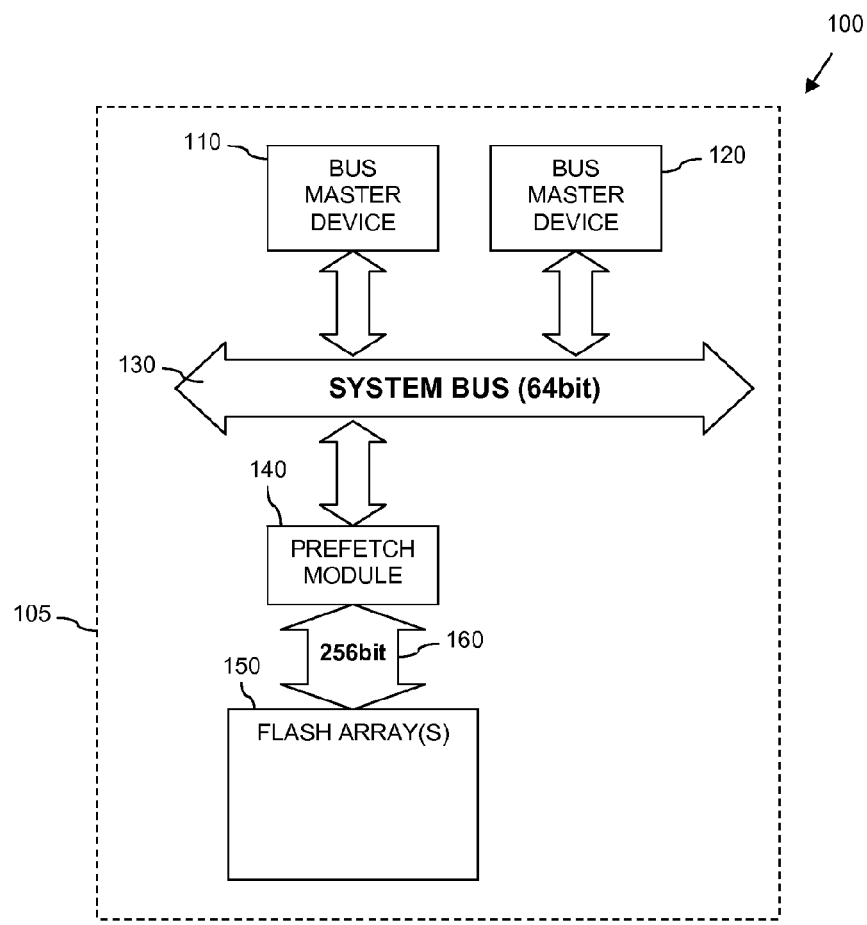
FIG. 1 illustrates an example of a signal processing system.

Referring first to FIG. 1, there is illustrated an example of a signal processing system 100 adapted in accordance with some example embodiments of the present invention. For the illustrated example, the signal processing system 100 comprises one or more system bus master devices, and in particular for the illustrated example comprises a first bus master device 110 and a second bus master device 120. Each of the bus master devices 110, 120 may comprise, by way of example only, a signal processing core, direct memory access (DMA) module, or the like. Other master devices could include communication processors, such as Ethernet or FlexRay™ controllers, graphics processors and/or controllers, etc. The signal processing system 100 further comprises at least one system interconnect.

The, or each, system interconnect may be implemented in any suitable manner, such as by way of a system bus 130 operating according to a system bus protocol, such as the Peripheral Component Interface (PCI) protocol. Alternatively, the or each system interconnect may comprise switching circuitry, which may route information between different master and slave devices connected thereto. In some examples, master devices that are external to an integrated circuit (IC) 105 on which the signal processing system 100 is provided may also be operably coupled to a system interconnect, such as the system bus 130, for example via an external bus or interconnect pin (not shown) on the IC 105.

For the illustrated example, the one or more master devices 110, 120 is/are operably coupled to one or more memory elements by system bus 130, which memory element(s) comprise(s) an on-chip a memory element, for example in a form of Flash memory element 150 for the illustrated example. In order to improve the overall throughput of data from the memory element 150, a prefetching module 140 is provided between the system bus 130 and the memory element 150, for prefetching lines of data from the memory element 150. The Flash memory element 150 comprises one or more arrays of memory cells (not shown), each cell capable of storing one bit of data. The width of each row (or line) of memory cells in a memory element array may be defined as: n* system bus width.

For the illustrated example, the system bus 130 is arranged to be 64 bits wide, and the Flash memory element 150 is arranged to comprise data lines that are 256 bits wide (4*64). In this manner, each line of data within the Flash memory element 150 comprises n (4 for the illustrated example) addressable blocks of data. Accordingly, the prefetching module 140 is operably coupled to the Flash memory element 150 via an interconnect 160 of width equal to a line of data within the Flash memory element 150 (i.e. 256 bits for the illustrated example). When an addressable block of data is required to be accessed by a master device 110, 120, the corresponding line of data is fetched (or prefetched as described below) from the Flash memory element 150 by the prefetching module 140 and stored in a buffer. The required block of addressable data therein may then be forwarded on to the appropriate master device 110, 120.

Conventional prefetching mechanisms typically work on the following (or similar) principal. Whilst addressable blocks of data within a line of data in the memory block are being accessed by a master device 110, 120, a number n of subsequent lines of data are speculatively pre-fetched from the Flash memory element 150 (e.g. before any request for data within such a line has been received). By the time the first line of data has been read across the narrower system bus 130, the next subsequent line of data will, in principal, be ready for accessing, thereby substantially alleviating the delay in accessing the relatively slow Flash memory element 150. Whilst such speculative prefetching of data works well for linear code (namely code that executes from sequential addresses with no change of flow), such speculative prefetching can have a detrimental effect on system performance for code that may have frequent changes of flow when unnecessary speculative prefetches occur.

The inventors have observed that, due to various factors (e.g. wider Flash arrays, variable length encoding (VLE), multiple master devices), the average ratio of used-to-unused prefetched lines of data from a memory element decreases in more recent signal processing implementations, for example as the proportion of unnecessary speculative prefetches increases. As a result, the impact on system-level performance resulting from unnecessary speculative prefetches increases.

The inventors have also observed that, within applications comprising certain application code characteristics, an optimum number of subsequent lines of data to prefetch, in response to an addressable block of data being accessed, can vary depending on the position of the block of data being accessed within its respective line of data in memory. For example, if an address that is accessed falls in the latter half of the line of data in memory, then an optimum number of flash lines to prefetch may be higher than if the address that is being accessed falls in the first half of the line of data in memory. Accordingly, it is proposed that by varying the number of lines of data to prefetch based on where the address being accessed falls within its respective line of data in memory, prefetching of lines of data from memory may be generally improved to reduce the number of unnecessary speculative prefetches.

Accordingly, the prefetching module 140 of the illustrated example may be arranged to determine a position of a requested block of data within a respective line of data of the memory element, say Flash memory element 150, determine a number (n) of subsequent lines of data to prefetch based at least partly on the determined position of the requested block of data within the respective line of data of the memory element, and cause the prefetching of n successive lines of data from the at least one memory element. In this manner, the prefetching of lines of data from the memory element may be varied depending on the position of the block of data being accessed within its respective line of data in memory in order to reduce the overall number of unnecessary speculative prefetches.

Figure 2:
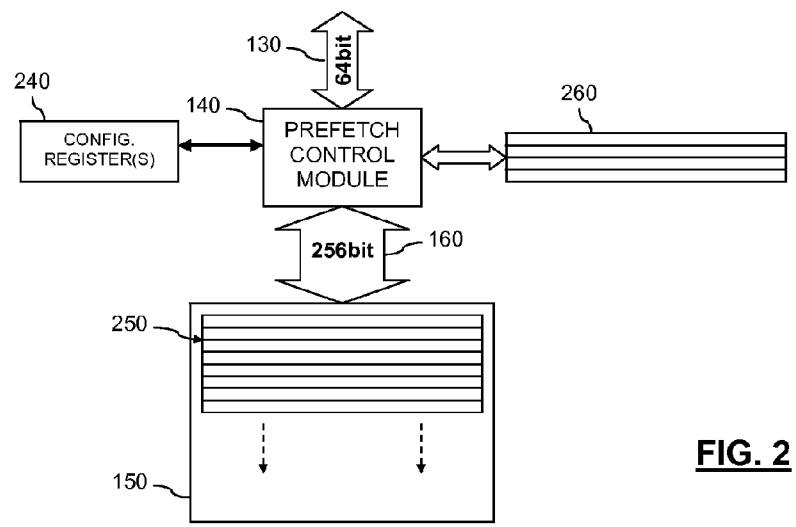
FIG. 2 illustrates an example of an implementation of a prefetching module.

FIG. 2 illustrates an example of an implementation of the prefetching module 140 in greater detail. As can be seen in FIGS. 1 and 2, the prefetching module 140 of the illustrated example is operably coupled to the system bus 130, which for the illustrated example comprises a 64-bit system bus. In this manner, the prefetching module 140 is arranged to receive memory access requests from master devices, such as master devices 110, 120 via the system bus 130 of FIG. 1. Data is stored within the memory element 150 within lines of data, illustrated generally at 250. For the illustrated example, each line of data 250 comprises up to 256 bits of data. Accordingly, the prefetching module 140 is operably coupled to the memory element 150 via a 256-bit wide interconnect 160, via which the prefetching module 140 is arranged to access data stored within the memory element 150. The prefetching module 140 is arranged to prefetch lines of data 250 from the memory element 150, for example in response to a memory access request received over the system bus 130, and to store the prefetched lines of data in a buffer 260. Data requested (by way of received memory access requests) may then be retrieved from the appropriate line of data stored within the buffer 260, and returned to the requesting master device 110, 120 via the system bus 130. Typically, the buffer 260 is capable of storing multiple lines of data, although typically the buffer 260 may be limited to only a small number of lines of data (e.g. four) for reasons of cost and silicon real estate limitations.

Figure 3:
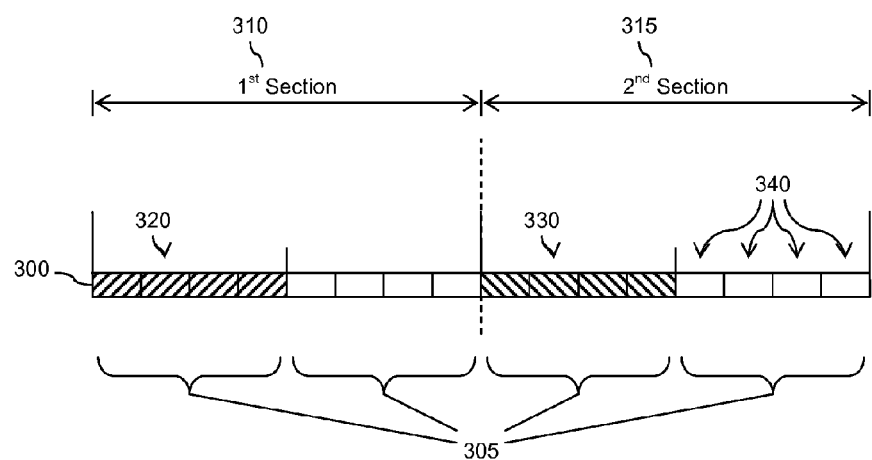
FIG. 3 illustrates an example of a line of data.

Referring now to FIG. 3, there is illustrated an example of a line of data 300, such as may be stored within a data line 250 of the memory element 150. As previously mentioned, in one example, the system bus 130 of FIG. 1 is 64-bits wide, whilst a line of data, such as the line of data 300, comprises 256 bits of data (namely 4*64). Accordingly, the line of data 300 comprises four addressable blocks of data, illustrated generally at 305.

Upon receipt of a memory access request (e.g. a read request) via the system bus 130 of FIG. 1, the prefetching module 140 checks to see if the line of data comprising the requested block of data has already been (pre)fetched from memory, and is already stored within the buffer 260 of FIG. 2. If the appropriate line of data is already available within the buffer 260, the prefetching module 140 may simply retrieve the requested block of data from the buffer 260, and return it to the requesting master device 110, 120 via the system bus 130.

However, if the appropriate line of data is not available within the buffer 260, the prefetching module 140 fetches the appropriate line of data from the memory element 150 and loads it into the buffer 260. The prefetching module 140 may then retrieve the requested block of data and return it to the requesting master device 110, 120 via the system bus 130. In either case, the prefetching module 140 may subsequently (or in parallel with retrieving the requested data) be arranged to determine a number of subsequent lines of data to prefetch in response to the receipt of a memory access request.

The prefetching module 140 of the illustrated example may also be arranged to determine a position of a requested block of data 305 within a respective line of data 300 of the memory element 150. The prefetching module 140 may also be arranged to determine a number (n) of subsequent lines of data 250 to prefetch, based at least partly on the determined position of the requested block of data 305 within the respective line of data 300 of the memory element 150, and thereafter cause the prefetching of n successive lines of data 250 from the at least one memory element 150.

For example, and in accordance with some embodiments of the present invention, the prefetching module 140 may be arranged to divide the line of data 300 comprising the requested block of data 305 into sections, determine a section of the line of data 300 within which the requested block of data 305 is located, and determine the number (n) of subsequent lines of date 250 to prefetch based at least partly on the determined section within which the requested block of data (305) is located.

For example, and as illustrated in FIG. 3, the prefetching module 140 may be arranged to divide the line of data into two sections, as illustrated generally at 310 and 315. The prefetching module 140 may then determine in which of these two sections 310, 315 the requested block of data 305 is located, and determine the number (n) of subsequent lines of data 250 to prefetch, based (at least partly) on which of the two sections 310, 315 the requested block of data 305 is located. For example, if the requested block of data is located within the first section 310, for example as illustrated at 320, the prefetching module 140 may be arranged to cause n=x subsequent lines of data 250 to be prefetched, where x comprises, say, a default number of subsequent lines of data 250 to prefetch.

Conversely, if the requested block of data is located within the second section 315, for example as illustrated at 330, the prefetching module 140 may be arranged to cause n=x+i subsequent lines of data 250 to be prefetched, where i is, say, an offset value, for example equal to 1. In this manner, when a requested block of data 305 is located within a latter part of a line of data 300 (and therefore where the likelihood of subsequent prefetches being valid is greater), the number of subsequent lines of data 250 to be prefetched may be greater (by the offset i in this example). Conversely, when a requested block of data 305 is located toward the start of a line of data, the number of subsequent lines of data 250 to be prefetched may be fewer (limited to just the default number x in this example; effectively setting i to zero).

For the example illustrated in FIG. 3, the line of data 300 is divided into two substantially equal sections 310, 315. As such, the prefetching module 140 is arranged to determine whether a requested block of data 305 is located within a first half (310) or a second half (315) of the respective line of data 300. In this manner, and if it is determined that the requested block of data 305 is located within the first half (310) of the respective line of data 300, the prefetching module 140 may configure the number (n) of subsequent lines of data 250 to prefetch to be n=x. Conversely, if it is determined that the requested block of data 305 is located within the second half (315) of the respective line of data 300, configure the number (n) of subsequent lines of data 250 to prefetch to be n=x+i.

In one example, the line of data 300 may not be limited to being divided into just two sections, as illustrated in FIG. 3, but may equally be divided into any suitable number (s) of sections, which may be of equal size or alternatively may be of differing sizes (if such differing sizes prove advantageous for specific application code characteristics).

The effectiveness of any prefetching mechanism may be dependent to a large degree on the specific characteristics of application code being executed by the signal processing system, and on the specific system architecture of which the prefetching mechanism forms a part. Accordingly, in some examples, one or more of the above mentioned parameters n, s, x and/or i may be configurable in order to adapt the operation of the prefetching module 140 to better suit the specific characteristics of the application code being executed and/or the particular system architecture within which the prefetching module 140 has been implemented. Accordingly, for the example illustrated in FIG. 2, the prefetching module 140 is operably coupled to at least one configurable register 240 for configurably storing at least one of the group of configurable parameters n, s, x, and/or i. The configurable register 240 may comprise, for example, an interface (not shown) available to application program code executing on one or more of the master devices 110, 115, to enable the configurable parameters n, s, x, and/or i to be configured by a user (programmer), and even to be dynamically configurable.

In some examples, the present invention may be of particular applicability for applications in which code being executed exhibits a change of flow, say with a change of flow on average every c cycles, where c is significantly less than the quantity of instructions contained within a flash memory line. For example, VLE (variable length encoding) is a type of encoding for machine language instruction sets in which different instructions may comprise different lengths in terms of the number of bits that make up the instruction.

Accordingly, the start of an instruction is determined by the length of the previous instruction, as well as the starting position of the previous instruction. Furthermore, for the example illustrated in FIG. 3, each block of data 305 may comprise multiple VLE instructions, for example up to four as illustrated generally at 340, and a line of data 300 may comprise, for the illustrated example, up to 16 VLE instructions. Thus, since a single data line 300 may comprise such a large number of VLE instructions, example embodiments may be particularly applicable to applications and systems that are implemented using, or that may comprise VLE instructions. In particular, for VLE code, it has been found that the likelihood of needing to immediately access the next sequential flash line is greatly reduced if the initial access lies within the first half of a flash line. Table 1 below shows two sets (Benchmark1 and Benchmark2) of measured success rates for conventional prefetch schemes:

TABLE 1

|  |  | Benchmark1 * | | Benchmark2** | |
|---|---|---|---|---|---|
|  |  | VLE | BookE | VLE | BookE |
| Flash Access | Linefills | 34.30% | 30.90% | 33.50% | 30.00% |
|  | Lookahead fills | 65.70% | 69.10% | 66.50% | 70.00% |
|  | Lookahead fills not used | 40.10% | 31.70% | 32.60% | 27.80% |
|  | % increase in unused fills |  | 8.40% |  | 4.80% |
| Hit rates | Buffer hit rate (inc linefill) | 72.80% | 76.70% | 78.70% | 81.50% |
|  | Prefetch data hit rate | 28.80% | 32.90% | 28.50% | 31.30% |
|  | Drop in hit rate |  | 4.10% |  | 2.80% |

In the above example, the first portion of the table may comprise the characteristics of the accesses made to the flash memory array:
- 'Linefills' are flash buffer lines that are filled due to a fetch of instruction/data.
- 'Lookahead fills' are just another term for prefetches.
- 'Lookahead fills not used' are wasted prefetches that should be avoided.

The measurements were taken for two different pieces of code: (i) in VLE (majority small 16-bit instructions;) and (ii) classic BookE (all 32-bit instructions). As can be seen, there is a significantly higher proportion of flash accesses that are made but not used (lookahead fills not used) in the case of the VLE code.

The second portion of the table illustrates the success the CPU has in accessing the flash buffers.
- 'Buffer hit rate (including line fill)', in this case, effectively refers to an access made to the flash buffers. If the data fetched is already there (most likely because it is the next sequential instruction fetch in a flash line that has already been fetched) then it is counted. This also includes fetches that trigger a line fill (i.e. access the flash).
- Prefetch data hit rate refers to the success in fetching instructions/data from flash lines that have been speculatively prefetched.

The second portion of the table also illustrates that for both cases there is a decrease in the hit rate of the speculatively prefetched data when VLE instructions are used. Thus, there is a discernable trend of the more instructions that fit into a single flash line, the less the likelihood of needing to prefetch subsequent lines. Accordingly, the likelihood of needing to immediately access the next sequential flash line is greatly reduced if the initial access lies within the first half of a flash line in such cases.

Figure 4:
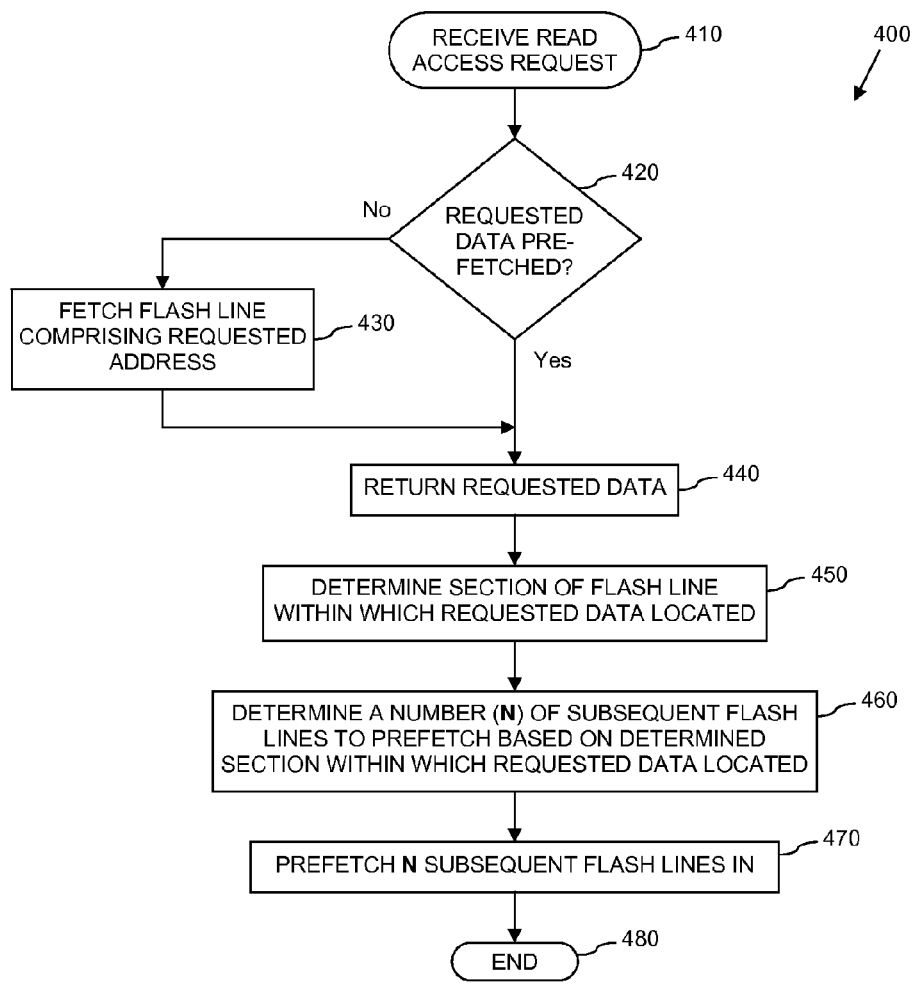
FIG. 4 illustrates an example of a simplified flowchart of a method for prefetching data.

Referring now to FIG. 4, there is illustrated an example of a simplified flowchart 400 of a method for prefetching lines of data from at least one memory element according to some examples embodiments of the present invention, and which may be implemented within a prefetching module, such as the prefetching module 140 illustrated in FIGS. 1 and 2.

The method starts at step 410 with a receipt of a memory access request, for example from a bus master device, such as a signal processing core or the like. Next, at step 420, for the illustrated example it is determined whether the requested block of data has already been (pre)fetched from memory, for example by determining whether a line of data comprising the requested block of data is currently loaded within a buffer. If the requested block of data has not already been (pre)fetched from memory, the method moves to step 430, where the line of data comprising the requested block of data is fetched from memory, and for example loaded into a buffer. The method then moves on to step 440.

Referring back to step 420, if the requested block of data has already been (pre)fetched from memory, the method moves straight to step 440. At step 440, the requested block of data is returned, for example to a bus master device from which the initial memory access request was received. The method then moves on to step 450 where a position of the requested block of data within its respective line of data is determined, which for the illustrated example comprises determining a section of the respective line of data within which the requested block of data is located. A number (n) of subsequent lines of data to prefetch is then determined, for example based at least partly on the determined position of the requested block of data within the respective line of data of the at least one memory element, at step 460. Next, at step 470, n successive lines of data are then caused to be prefetched from the at least one memory element. The method then ends at 480.

Because the illustrated embodiments of the present invention may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The invention may also be implemented, at least in part, in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system.

The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, for the illustrated examples, prefetching module 140 has been illustrated for clarity as a discrete logical entity, separate from the memory element 150, register 240 and buffer 260. However it will be appreciated that the prefetching module 140 may be implemented as part of the same integrated circuit as one or more of these other components.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit device comprising:
   at least one memory element storing a plurality of lines of data; and
   at least one prefetching module for prefetching lines of data from the at least one memory element, wherein the prefetching module is configured to:
   determine a position of a requested block of data within a respective line of data within the at least one memory element by dividing the line into s sections and determining which section includes the requested block;
   determine a number of subsequent lines of data to prefetch, based at least partly on the determined section; and
   cause the prefetching of the number of subsequent lines of data from the at least one memory element based thereon.

2. The integrated circuit device of claim 1 wherein the number of subsequent lines of data to prefetch, n, is determined according to n=x+i, where x is a default number of lines to prefetch, and i is an offset value dependent on the determined section of the line of data within which the requested block of data is located.

3. The integrated circuit device of claim 2, wherein at least one of s, x, and i is a configurable parameter.

4. The integrated circuit device of claim 2 wherein the prefetching module is operably coupled to at least one register configured to store at least one of the parameters n, s, x, and i.

5. The integrated circuit device of claim 2 wherein the prefetching module is further configured to:
   determine, if s=2, whether a requested block of data is located within a first half or a second half of the respective line of data within the at least one memory element; and
   if it is determined that the requested block of data is located within the first half of the respective line of data, configure the number of subsequent lines of data to prefetch to be n=x; or
   if it is determined that the requested block of data is located within the second half of the respective line of data, configure the number of subsequent lines of data to prefetch to be n=x+i.

6. The integrated circuit device of claim 1 further comprising:
   a system bus, wherein the prefetching module is further configured to receive a request for the requested block of data via the system bus.

7. The integrated circuit device of claim 6 wherein the prefetching module is further configured to return the requested block of data via the system bus.

8. The integrated circuit of claim 7 wherein the prefetching module is further configured to:
   determine a position of the returned block of data within a respective line of data of the at least one memory element;
   determine a number of subsequent lines of data to prefetch based at least partly on the determined position of the returned block of data within the respective line of data of the at least one memory element; and
   cause the prefetching of the number of successive lines of data to prefetch from the at least one memory element.

9. The integrated circuit device of claim 1 wherein the prefetching module is further configured to determine whether the requested block of data has been prefetched, and if it is determined that the requested block of data has not been prefetched, to cause the requested data to be fetched from the at least one memory element.

10. The integrated circuit device of claim 1 wherein the at least one memory element comprises an on-chip memory element.

11. The integrated circuit device of claim 1 wherein the at least one memory element comprises a Flash memory element.

12. A signal processing system comprising:
    at least one memory element storing a plurality of lines of data; and
    at least one prefetching module for prefetching lines of data from the at least one memory element, wherein the prefetching module is configured to:
       determine a position of a requested block of data within a respective line of data of the at least one memory element by dividing the line into s sections and determining which section includes the requested block;
       determine a number of subsequent lines of data to prefetch, based at least partly on the determined section; and
       cause the prefetching of the number of subsequent lines of data n from the at least one memory element based thereon.

13. A method for prefetching lines of data from at least one memory element; the method comprising:
    determining a position of a requested block of data within a respective line of data of the at least one memory element by dividing the line into s sections and determining which section includes the requested block;
    determining a number of subsequent lines of data to prefetch, based at least partly on the determined section; and
    causing the prefetching of the number of subsequent lines of data n from the at least one memory element based thereon.

14. The method of claim 13 further comprising:
    receiving a request for the requested block of data via a system bus.

15. The method of claim 13 further comprising:
    determining whether the requested block of data has been prefetched;
    causing the requested block of data to be fetched from the at least one memory element, if the requested block of data has not been prefetched.

16. The method of claim 13 further comprising:
    determining the number of subsequent lines of data to prefetch using a sum of a default number of lines to prefetch (x) and an offset value (i) dependent on the determined section of the line of data within which the requested block of data is located.

17. The method of claim 16 further comprising:
    determining, if s=2, whether a requested block of data is located within a first half or a second half of the respective line of data;
    configuring the number of subsequent lines of data to prefetch to be x, when the requested block of data is located within the first half of the respective line of data; and
    configuring the number of subsequent lines of data to prefetch to be x+i, when the requested block of data is located within the second half of the respective line of data.

* * * * *